(12) United States Patent
Furutani

(10) Patent No.: US 8,279,353 B2
(45) Date of Patent: Oct. 2, 2012

(54) IMAGE PROCESSING DEVICE

(75) Inventor: Senichi Furutani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1046 days.

(21) Appl. No.: 12/222,941

(22) Filed: Aug. 20, 2008

(65) Prior Publication Data

US 2009/0052868 A1 Feb. 26, 2009

(30) Foreign Application Priority Data

Aug. 21, 2007 (JP) .................................. 2007-215229

(51) Int. Cl.
*H04N 5/57* (2006.01)
(52) U.S. Cl. ........................... 348/687; 348/571; 348/673
(58) Field of Classification Search ........... 348/353–355, 348/571, 673, 687
See application file for complete search history.

(56) References Cited

U.S. PATENT DOCUMENTS

| | | | | |
|---|---|---|---|---|
| 6,263,502 B1* | 7/2001 | Morrison et al. | ................ | 725/47 |
| 7,009,659 B2* | 3/2006 | Dew et al. | ..................... | 348/553 |
| 2003/0007001 A1* | 1/2003 | Zimmerman | ................. | 345/716 |
| 2005/0069280 A1* | 3/2005 | Chen et al. | ..................... | 386/46 |
| 2005/0120372 A1* | 6/2005 | Itakura | ............................ | 725/46 |
| 2006/0007358 A1* | 1/2006 | Kim | ................................ | 348/553 |
| 2008/0016532 A1* | 1/2008 | Wang et al. | .................... | 725/45 |

FOREIGN PATENT DOCUMENTS

| | | |
|---|---|---|
| JP | 08-098111 | 4/1996 |
| JP | 2000-228751 | 8/2000 |

* cited by examiner

*Primary Examiner* — Pankaj Kumar
*Assistant Examiner* — Mulugeta Mengesha
(74) *Attorney, Agent, or Firm* — Morgan, Lewis & Bockius LLP

(57) ABSTRACT

An image processing device is provided with a picture quality mode which is used to collectively set a plurality of the picture qualities by one operation, a user can select the picture quality mode depending on his preference or content of programs to be viewed. A recording portion stores an association table. The association table is a table in which the picture quality mode and sound quality setting values to direct sound quality setting for a sound quality setting portion, are correlated with each other and stored. When a control portion receives a picture quality setting command by a designation of the picture quality mode, the picture quality setting portion performs setting of the respective picture qualities depending on the picture quality mode. Further, the setting direction portion reads out the association table and obtains the sound quality setting values which are correlated with the designated picture quality mode. Then, sound quality setting is performed by giving the obtained sound quality setting values for the sound quality setting portion.

5 Claims, 6 Drawing Sheets

FIG.4

| PICTURE QUALITY MODE | SOUND QUALITY | | |
|---|---|---|---|
| | TREBLE | BASS | SURROUND |
| STANDARD | 0 | 0 | OFF |
| DYNAMIC | 5 | 5 | OFF |
| MOVIE | 2 | 1 | ON |
| NEWS | 3 | 3 | OFF |

FIG.5

| PICTURE QUALITY | SOUND QUALITY | |
|---|---|---|
| | TREBLE | BASS |
| BRIGHTNESS | 0.5 | 0.5 |
| CONTRAST | — | 0.5 |
| HUE | — | — |
| FEATHERING | — | — |
| SHARPNESS | 0.5 | — |

IMAGE PROCESSING DEVICE

This application is based on Japanese Patent Application No. 2007-215229 filed on Aug. 21, 2007, and the contents of which are hereby incorporated, by reference.

BACKGROUND OF THE INVENTION

1. Field of the Invention

The present invention relates to an image processing device, and particularly, the present invention relates to an image processing device which can perform picture quality setting of a video signal and sound quality setting of an audio signal at the same time.

2. Description of Related Art

Recently, because digital technology evolves into multi-function and diversification, various image processing devices such as wide screen television, high definition television, and the like become popular. These image processing devices output image to display device such as a cathode ray tube, a liquid crystal monitor, or the like, and it is necessary to set in advance picture quality of the image, such as contrast, brightness, and the like. Further, it is necessary to set in advance sound quality of an audio signal, such as bass (low frequency component), and treble (high frequency component).

Setting of these are performed generally in response to a user operation which is received in a setting screen that is displayed by an On Screen Display (OSD) function. However, it is necessary for a user to set the picture quality and the sound quality individually because the setting screen for the picture quality and the setting screen for the sound quality are usually different.

In relation to above described problem, in JP-A-2000-228751, a wide screen television which can switch properly in a short period of time a display mode of a regular screen in four to three (4:3), a wide screen in sixteen to nine (16:9), and the like, is disclosed. This wide screen television detects a kind of aspect ratio of the image from input video signal, if the detected kind continues for a prescribed time interval, the wide screen television switches a display mode complying with the image and display the image. Further, the television is provided with an audio mode detecting portion which detects switching of mode identification signal of audio signal, and can change a display mode by detecting the switching of the audio mode.

In addition in relation to the above described problem, in JP-A-H08-098111, a television receiver which solves complicated setting of the audio mode which must be set for every channel in case where a user changes a channel, is disclosed. This television receiver automatically discriminates the audio mode which is optimized to an audio visual reproducing style of a user to output audio signal for every channel. As a result, it is not necessary to set again the audio mode any time when the user changes the channel, and the user is free from the complicated setting of the audio mode.

However, the television receivers disclosed in the above described JP-A-2000-228751 and JP-A-H08-098111 can perform changing of the audio mode in response to kind of the video signal and change of the channel, setting of the picture quality and the sound quality in usual reproducing where these change do not happen, must be performed manually by the user in advance as in the conventional art.

SUMMARY OF THE INVENTION

The present invention is made in view of the above described problem, and it is an object of the present invention to provide an image processing device which makes it possible to more effectively perform setting operation of a picture quality such as contrast, brightness, and the like and a sound quality such as bass, treble, and the like which a user sets for the device in advance.

To attain the above described object an image processing device in accordance with the present invention include: a picture quality setting portion which sets picture quality of a video signal; a sound quality setting portion which sets sound quality of an audio signal; and a command receiving portion which receives designation of a setting value group to collectively set picture quality setting values of a plurality of picture quality setting items, and the image processing device is characterized in that the image processing device further includes: a recording portion which stores an association table in which the setting value group and a sound quality setting values to direct sound quality setting for the sound quality setting portion, are correlated with each other; and a setting direction portion which reads out from the association table the sound quality setting values that are correlated with the setting value group when the command receiving portion receives a picture quality setting command by designation of the setting value group to direct the sound quality setting portion to set the sound quality based on the sound quality setting values which are read out.

By this arrangement the image processing device in accordance with the present invention includes: a picture quality setting portion which sets picture quality of a video signal that is output to monitor or the like, for example, the brightness, the contrast and the like; and a sound quality setting portion which sets sound quality of an audio signal, for example, treble, bass and the like. Further, the image processing device includes a picture quality mode, that is, a setting value group which is used to collectively set a plurality of kinds of picture quality by one operation at a time. As for the picture quality mode, a plurality of modes, for example, "standard", "movie" and the like are prepared, and the image processing device is made such that a user can select the picture quality mode depending on his preference or content of programs to be viewed.

Further, a recording portion of the image processing device stores an association table. The association table is a table in which the picture quality mode and a prescribed sound quality setting values to direct the sound quality setting portion to set sound quality, are correlated with each other and stored. As for the sound quality setting items which are stored in the association table, for example, there are treble (high frequency component), bass (low frequency component), and like.

When a control portion receives a picture quality setting command by designation of the picture quality mode, the picture quality setting portion performs the respective picture quality settings corresponding to the picture quality mode. Further, a setting direction portion reads out the association table and obtains the sound quality setting values that is correlated with the designated picture quality mode. Then, the setting direction portion directs the sound quality setting portion to set the sound quality by giving the obtained sound quality setting values. As above described, by performing the picture quality setting, the sound quality setting that corresponds to content of the picture quality setting is performed at the same time.

Further, to attain the above described object, the image processing device in accordance with the present invention is characterized in that when the setting direction portion receives direction to execute the individual setting mode in which a plurality of picture quality setting items are individually set, the setting direction portion reads out from the recording portion the sound quality setting values that are correlated in advance with an individual setting mode to direct the sound quality setting portion to set the sound quality based on the sound quality setting values which are read out.

By this arrangement in the image processing device in accordance with the present invention the setting direction portion reads out from the recording portion the sound quality setting values that are prepared in advance for performing the individual setting mode when direction of execution of the individual setting mode in which the picture quality setting items such as the brightness, the contrast, and like are individually set in manual operation, is received. Then the setting direction portion directs the sound quality setting by giving the sound quality setting values which are read out to the sound quality setting portion. As above described, not only the picture quality setting by the mode selection, the sound quality setting can be performed at the same time even when the picture quality setting by manual setting is performed.

Further, to attain the above described object, the image processing device in accordance with the present invention is characterized in that the association table stores amount of alteration of the sound quality setting values to be altered depending on increase or decrease of the respective picture quality setting values, when the setting direction portion receives direction to execute an individual setting mode in which a plurality of picture quality setting items are individually set and alteration of the picture quality setting values are performed, the setting direction portion calculates the sound quality setting values depending on increase or decrease of the picture quality setting values utilizing the association table to direct the sound quality setting portion to set the sound quality based on the calculated values.

By this arrangement, value of the sound quality setting values to be altered depending on increase or decrease of the respective picture quality setting values by manual setting, are decided and stored in the association table in advance. As a result, when direction of execution of an individual setting mode of the picture quality is received, the setting direction portion calculates the sound quality setting values to be set depending on increase or decrease of the directed picture quality setting values utilizing the association table. Then, the setting direction portion directs the sound quality setting by output the calculated values to the sound quality setting portion. As above described, when the picture quality setting by manual setting is performed, the sound quality setting that corresponds to content of the manual setting can be performed at the same time.

Further, to attain the above described object, the image processing device in accordance with the present invention is characterized in further comprising an association table editing portion which receives content alteration command for the association table, and performs value alteration of the sound quality setting values that are contained in the association table based on the content alteration command.

By this arrangement the image processing device includes the association table editing portion which receives content alteration command for the association table. The association table editing portion performs value alteration of the sound quality setting values that are correlated with the picture quality mode and the manual setting in the association table based on the received content alteration command. As a result, for example, a user can perform alteration of the sound quality setting in case where the user feels that the sound quality setting which is correlated with the picture quality mode does not match the picture quality mode.

Further, to attain the above described object, the image processing device in accordance with the present invention is characterized in that the setting value group includes at least the contrast, the brightness, and sharpness as the picture quality setting items.

By this arrangement the picture quality mode includes the picture quality setting items such as at least the contrast, the brightness, and the sharpness. As a result, by selecting the picture quality mode, these picture qualities can be collectively set at a time.

Further, to attain the above described object, the image processing device in accordance with the present invention is characterized in that the sound quality setting items includes at least the bass component setting, treble component setting, and effective/ineffective setting of pseudo surround effect.

By this arrangement, the sound quality setting items which is correlated to the picture quality mode or the manual setting, includes at least the bass setting, the treble setting, and effective/ineffective setting value of pseudo surround effect. As a result, by setting the picture quality, these sound qualities can be collectively set at a time.

According to the present invention that is explained as above, because labor to set the sound quality can be saved, convenience of the image processing device can be improved. Further, even a user who is not accustomed to the sound quality setting can perform appropriate sound quality setting because the sound quality settings that are optimized for the respective picture quality modes are stored in the association table in advance.

Further, according to the present invention labor for the sound quality setting can be saved and convenience of the image processing device is improved because a user can set both of the picture quality and the sound quality at a time by performing the picture quality setting even when the picture quality setting is performed by the manual setting.

Further, according to the present invention modification of the sound quality setting can be performed, for example, in case where the sound quality setting which is correlated with the picture quality mode does not match the picture quality mode. As a result, easiness of maintenance after the image processing device is shipped from a factory is improved.

Further, according to the present invention convenience of the image processing device for a user is improved because the picture quality setting such as the contrast, the brightness, and the sharpness, and the sound quality setting can be collectively set at a time.

Further, according to the present invention convenience of the image processing device for a user is improved because the sound quality setting can be collectively set at a time by the treble setting, the bas setting, the effective/ineffective setting value of pseudo surround effect, and the like.

BRIEF DESCRIPTION OF THE DRAWINGS

FIG. 4 is a table diagram to show one example of an association table in accordance with the present invention;

FIG. 5 is a table diagram to show one example of an association table in accordance with the present invention;

DESCRIPTION OF THE PREFERRED EMBODIMENTS

Hereinafter embodiments of the present invention will be explained with reference to drawings. It should be noted that the embodiments shown here are mere examples and the present invention is not limited to the embodiments shown here.

Embodiment 1

<1. About Inner Structure>

Figure 2:
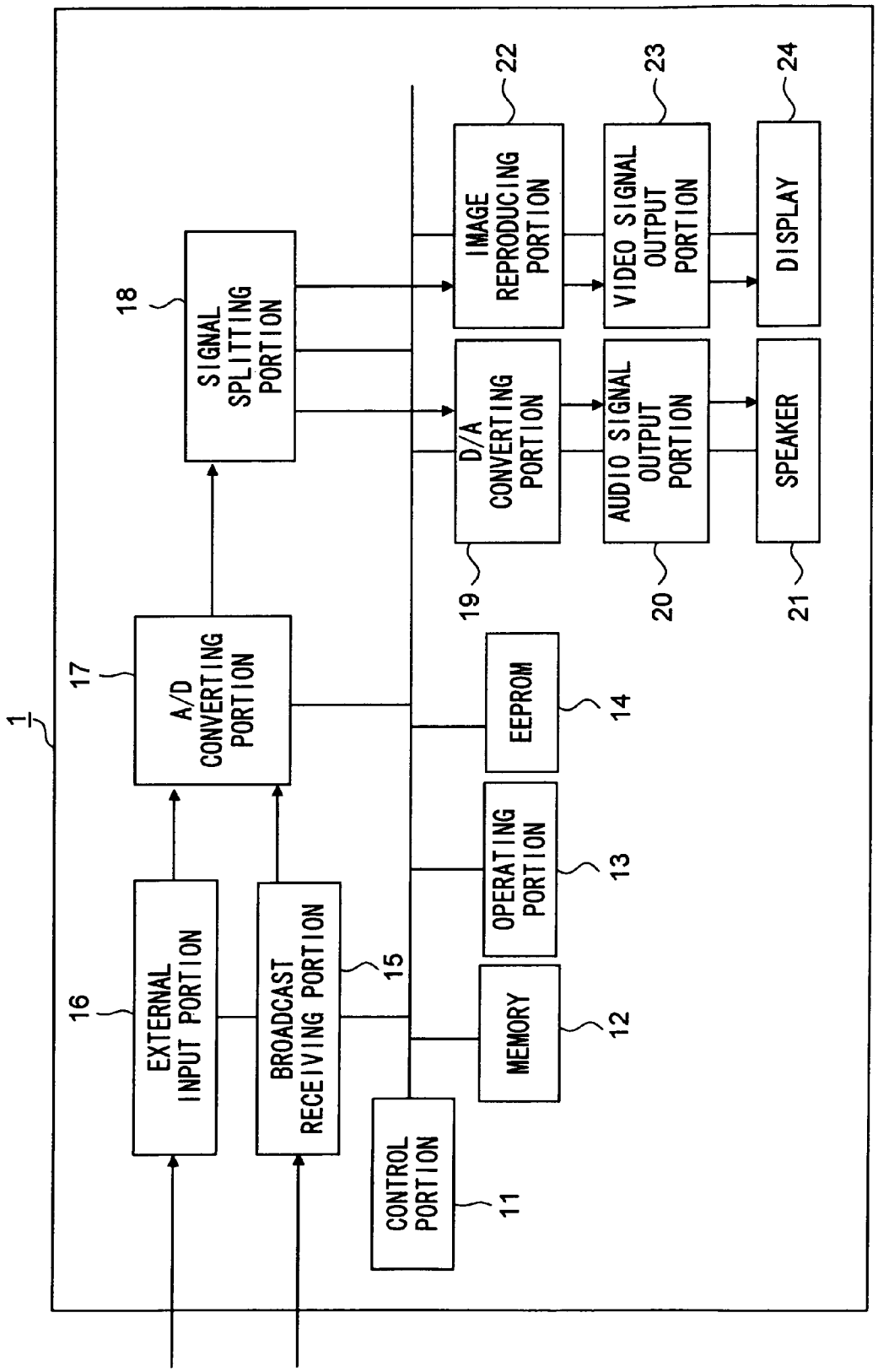
FIG. 2 is a structural diagram to show inner structure of the image processing device in accordance with the present invention.

FIG. 2 is a structural diagram to show a television device 1 (image processing device) according to one embodiment of the present invention. It should be noted that straight lines with arrow heads in FIG. 2 show flow of image data and audio data. Further, straight lines without arrow heads show communication buses through which a control portion 11 sends and receives control signals and the like for respective portions. The television device 1 is structured to include at least the control portion 11, a memory 12, an operating portion 13, an EEPROM 14 (recording portion), a broadcast receiving portion 15, an external input portion 16, an analog/digital (A/D) converting portion 17, a signal splitting portion 18, a digital/analog (D/A) converting portion 19, an audio signal output portion 20, a speaker 21, an image reproducing portion 22, a video signal output portion 23, and display 24.

The control portion 11 is an integrated controller to receive television broadcast, process received television broadcast to display and the like by controlling driving of the respective portions of the television device 1. The control portion 11 is composed of, for example, a plurality of microprocessors. Further, the control portion 11 is a mainstay to control the respective portions, calculate and process data and the like. It should be noted that details of the respective function portions (picture quality setting portion 11a—setting direction portion 11e in FIG. 1) which are provided with the control portion 11, will be described later.

The memory 12 is a medium to store temporally various data retained in the television device 1 and composed of, for example, Random Access Memory (RAM) which is recordable, and the like. The memory 12 plays a role as a buffer memory to store temporally processing data when various kinds of information are processed by the control portion 11, a direction command which is received from a user, and the like.

A user performs various commands for the television device 1 to perform recording of the television program and the like by the operating portion 13. The command output from the operating portion 13 is received by the control portion 11. The control portion 11 which receives the command performs a channel section process, a setting alteration process, and the like based on content of the command.

The EEPROM 14 is a kind of semiconductor memory and it is a ROM that a user of the device can write and erase data. Erasure of data from the EEPROM is performed by only electrical operation that electron is pulled out from a floating gate to a drain utilizing tunnel effect. Because the EEPROM 14 can perform writing and erasure while it is mounted on a circuit board, it is used for application which requires rewrite when it is utilized, for example, to store operation setting data for a device or information which is specific to a user. In the present invention the EEPROM is used to store an association table which will be described later.

The broadcast receiving portion 15 is connected to an external antenna (not shown) to perform tuning, receiving, frequency conversion, amplification, demodulation and the like of digital broadcasting or analog broadcasting. The video signal, the audio signal, and the like are consequently obtained from the received broadcasting signal. The broadcast receiving portion 15 is structured such that it contains an analog tuner, a video intermediate frequency amplifying circuit, a demodulation circuit, an amplifying circuit, and the like when it is in an analog method. Or, the broadcast receiving portion 15 is structured such that it contains a digital tuner, an error correction portion, multiple separator, and the like when it is in a digital method.

The external input portion 16 is an input interface that is composed of a plurality of external input terminals, for example, an RCA input terminal to which a composite signal is input, an S terminal to which S signal is input. The external input portion 16 connects the television device 1 with an external recording reproducing device, for example, a DVD player, a video recorder utilizing these external connecting terminals to input the video signal and the audio signal.

The A/D converting portion 17 converts an input signal into a digital signal in case where the input signal that is input from the broadcast receiving portion 15 or the external input portion 16 is an analog signal such as the composite signal or the like. It should be noted that in case where the input signal is a digital signal, the A/D converting portion 17 does not perform conversion and it outputs the input signal directly to the signal splitting portion 18 in next stage.

The signal splitting portion 18 separates the digital signal output from the A/D converting portion 17 into a digital signal which contains audio information and a digital signal which contains video information in case where the digital signal is encoded by MPEG2 system or the like. Between them, the digital signal which contains the audio information is sent to the D/A converting portion 19 to be converted into an analog signal and it is output to the audio signal output portion 20.

The audio signal output portion 20 converts the audio signal into sound to output utilizing the speaker 21. At this time the audio signal output portion 20 performs setting of output level based on the command which is received from the control portion 11.

Further, the digital signal which contains the video information which is separated by the signal splitting portion 18, is decoded by the image reproducing portion 22 and it is output to the video signal output portion 23. The video signal output portion 23 converts the input video signal into video signal in NTSC method or the like to display it on the display 24. It should be noted that the video signal output portion 23 performs setting of the output image such as the brightness, the sharpness based on the command received from the control portion 11 at this time.

The display 24 utilizes Liquid Crystal Display (LDC) module that is composed of, for example, a backlight, a liquid crystal panel, drivers, and the like. The backlight is a light emitting device which is disposed backside of the liquid crystal panel. As for the backlight, for example, an edge light method in which cold-cathode tube is utilized as a light source, and a direct backlight method in which fluorescent lamps are aligned at backside of the liquid crystal panel, are utilized. A light emission amount of light source of the backlight is adjusted by a backlight adjuster or an inverter circuit.

<2. About Structure of Function Portions>

Hereinafter, relation of the respective function portions which compose the setting function of the picture quality and the sound quality that are provided with the television device 1 according to one embodiment of the present invention, will be explained with reference to function block diagrams of FIG. 1.

Figure 1:
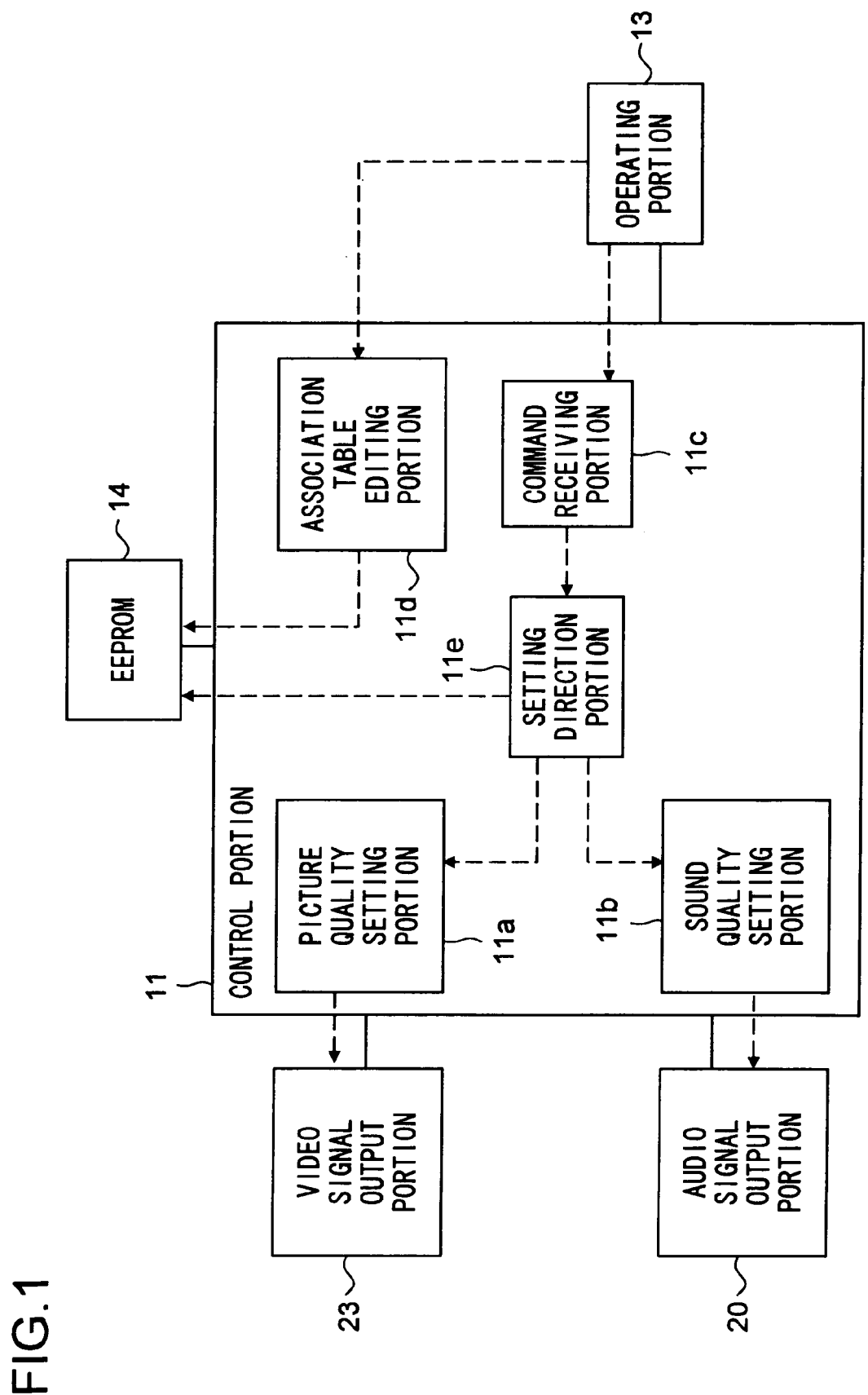
FIG. 1 is a functional block diagram to show structure of a function portion which is provided with the image processing device in accordance with the present invention.

As shown in FIG. 1, the setting function of the picture quality and the sound quality according to the present invention, is structured by at least, a picture quality setting portion 11a; a sound quality setting portion 11b; a command receiving portion 11c; an association table editing portion 11d; and a setting direction portion 11e, which are included in the control portion 11, an operating portion 13, an EEPROM 14, an audio signal output portion 20, and a video signal output portion 23.

The picture quality setting portion 11a sets for the video signal output portion 23 the picture quality of the video signal which is output by the video signal output portion 23. To be more concrete, the picture quality setting portion 11a gives setting values of the brightness, the contrast, the sharpness, and the like of the video signal which is output from the video signal output portion 23. Further, the picture quality setting portion 11a has a picture quality mode to perform a plurality of the picture quality setting at a time. In the picture quality mode, a plurality of the picture quality setting values, for example, such as the brightness and the contrast, which are decided in advance are included. When a user selects the picture quality mode, the picture quality setting portion 11a sets the respective setting values which are included in the picture quality mode in the video signal output portion 23.

The sound quality setting portion 11b sets for the audio signal output portion 20 the sound quality of the audio signal which is output by the audio signal output portion 20. To be more concrete, the sound quality setting portion 11b gives setting values of the treble, the bass, the surround effect, and the like of the audio signal which is output by the audio signal output portion 20.

The command receiving portion 11c receives the setting command which is output by the picture quality setting operation or the sound quality setting operation that is made by a user utilizing the operating portion 13. It should be noted that the user performs the picture quality setting operation and the sound quality setting operation with reference to a menu screen or the like which is displayed by an On Screen Display (OSD) portion that is not shown in the drawings.

The association table editing portion 11d receives an editing command which is output by the association table editing operation that is made by a user utilizing the operating portion 13. Then, based on the editing command, the association table editing portion 11d performs a content changing operation of the association table that is stored in the EEPROM 14. It should be noted that detail of the association table will be explained later.

When the command receiving portion 11c receives the setting direction command of the picture quality, the setting direction portion 11e reads the association table from the EEPROM 14 and obtains the sound quality setting values which are associated with the directed picture quality setting. Then, the setting direction portion 11e directs the picture quality setting portion 11a to set the picture quality by the received picture quality setting values and directs the sound quality setting portion 11b to set the sound quality by the obtained sound quality setting values from the association table.

<3. About Association Table>

Hereinafter one example of the association table which is included in the television device 1 according to one embodiment of the present invention, and relation of the drawings will be explained with reference to table diagrams shown in FIG. 4 and FIG. 5.

FIG. 4 is the association table which is used when the command receiving portion 11c receives a picture quality setting command (hereinafter it is referred to as "mode selecting direction") by direction of the picture quality mode. Further, FIG. 5 is the association table which is used when the command receiving portion 11c receives a direction to set manually the respective picture qualities independently without utilizing the picture quality mode (hereinafter it is referred to as "manual setting direction").

As shown in FIG. 4, the association table used for directing the picture quality mode is composed of two columns of the "picture quality mode" column and the "sound quality" column in this order from left side. Further, the "sound quality" column is divided into three columns of "treble" column, "bass" column, and "surround" column in this order from left side.

The "picture quality mode" column shows kinds of the picture quality mode to be directed when a user collectively set the picture quality. This embodiment prepares four kinds of selectable picture-quality modes such as standard, dynamic, movie, and news.

The standard mode is the most normal picture quality mode and in which values of the brightness and the contrast are set almost in intermediate values. The dynamic mode has a powerful effect on the picture and values of the brightness and the contrast are large. The movie mode is the picture quality like movie theater and values of the brightness and the contrast are small. The news mode is an adjusted value to closely reproduce natural colors such as a plant and a landscape. A user can select the picture quality modes described above to collectively set the respective picture quality setting values at one time without setting the brightness or the contrast individually.

The "sound quality" column shows sound quality setting items which correspond to the picture quality modes shown in the "picture quality mode" column. This embodiment prepares three sound quality setting items such as the treble, the bass, and the surround. For example, in case where the dynamic mode is selected as the picture quality mode, value of the treble is set to five (5), value of the bass is set to five (5), the surround (pseudo surround effect) is set to OFF which means disable by the sound quality setting portion 11b.

Further, as shown in FIG. 5, the association table for manual setting is composed of two columns of the "picture quality" column and the "sound quality" column in this order from left side. Further, the "sound quality" column is divided into two columns of "treble" column, and "bass" column in this order from left side.

The "picture quality" column shows selectable kinds of the picture quality to be set when a user manually performs picture quality setting, are shown. This embodiment prepares five kinds of selectable picture quality settings such as the brightness, the contrast, the hue, the feathering, and the sharpness.

The "sound quality" column shows sound quality setting values which correspond to values of the picture quality settings shown in the "picture quality" column. This embodiment prepares two kinds of the sound quality setting values such as the bass and the treble. For example, in a raw where "picture quality" is the brightness, values of the treble and the bass are one half (0.5). This means that when the brightness is increased by one degree, the treble and the bass are increased by one half (0.5) degree. Further, in a raw where "picture quality" is the contrast, value of the treble is null (none) and the value of the bass is one half (0.5). This means that when the contrast is increased by one degree, only the bass is increased by one half (0.5) degree. It should be noted that in the example shown in FIG. 5, because hue and feathering are null in all columns, they does not have any influence for the sound quality setting.

To be more concrete, if a user manually set value of the brightness to ten (10), value of the contrast to five (5), and value of the sharpness to six (6), for example, the value of treble becomes eight (8) which is sum of 10×0.5 (value corresponding to the brightness) and 6×0.5 (value corresponding to the sharpness). Further, the value of bass becomes seven point five (7.5) which is sum of 10×0.5 (value corresponding to the brightness) and 5×0.5 (value corresponding to the sharpness).

It should be noted that it is possible to appropriately alter values shown in FIG. 4 and FIG. 5 as far as they remain within scope of the present invention. Further, a user can give a command for the association table editing portion 11*d* to edit the table utilizing the operating portion 13, and each value in the association table can be consequently altered.

<4. About Setting Screen>

Hereinafter, one example of a picture quality setting screen and a sound quality setting screen which are generated and displayed on the display 24 by the OSD display portion (not shown) of the television device 1 according to one embodiment of the present invention will be explained with reference to screen diagrams of FIG. 6 to FIG. 9.

Figure 6:
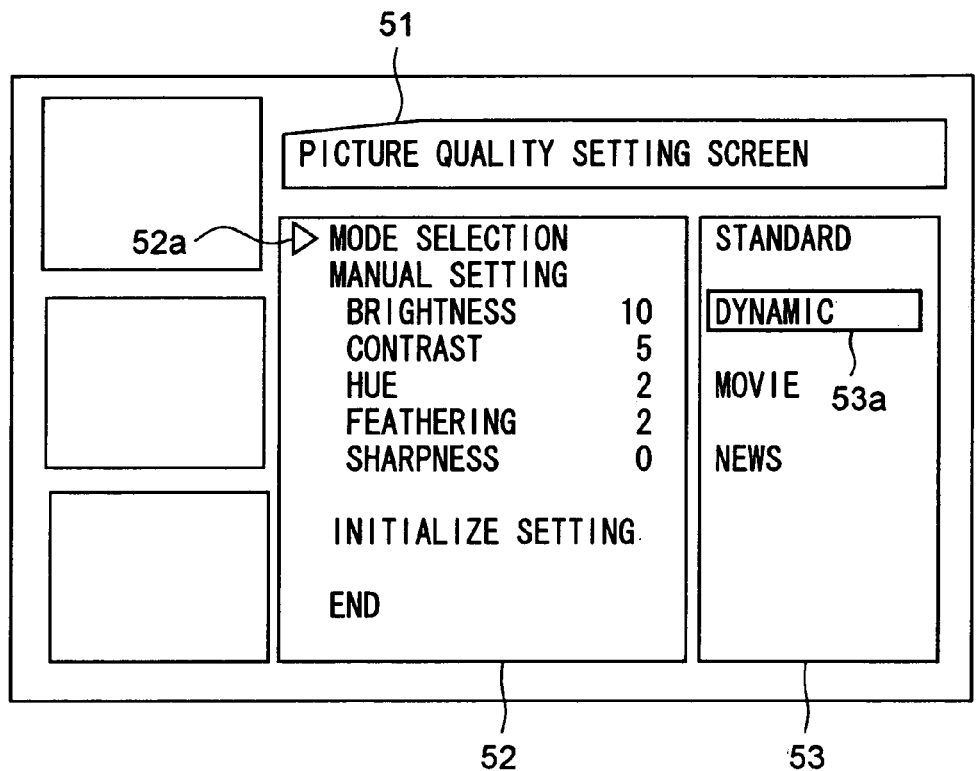
FIG. 6 is a screen diagram to show one example of a setting screen of picture quality in accordance with the present invention.

FIG. 6 is one example of the picture quality setting screen which is provided with the television device 1 according to one embodiment of the present invention. It should be noted that this screen can be displayed in arbitrary timing such as when the picture quality setting button which is provided with the operating portion 13 is pushed down, when the picture quality setting is selected by a user operation on a menu screen or the like which is displayed by the OSD, or the like. As shown in FIG. 6, the picture quality setting screen is structured such that it includes at least a title displaying area 51, a main operating area 52, and a sub operating area 53.

The title displaying area 51 is an area for displaying title of screen displayed at the moment, that is character strings of "picture quality setting screen" in this embodiment. The main operating area 52 is an area in which a user performs a selecting operation of an upper layer when a user performs the picture quality setting. It is possible to select "mode selection" or "manual setting" or the like to perform the picture quality setting in this embodiment. It should be noted that this selecting operation is performed by a cursor 52*a* which is displayed in the main operating area 52, and the cursor 52*a* is operated through the operating portion 13. In the embodiment shown in FIG. 6, the mode selection is designated by the cursor 52*a* and a plurality of picture quality modes for the mode selection are displayed in the sub operating area 53.

The sub operating area 53 is an area in which a user perform the selecting operation of a lower layer when a user performs the picture quality setting. In this embodiment, because the "mode selection" is chosen in the main operating area 52, it is possible to select to set from the plurality of picture quality modes. It should be noted that this selecting operation is performed by the cursor 53*a* which is displayed in the sub operating area 53, and the cursor 53*a* is operated through the operating portion 13.

Figure 7:
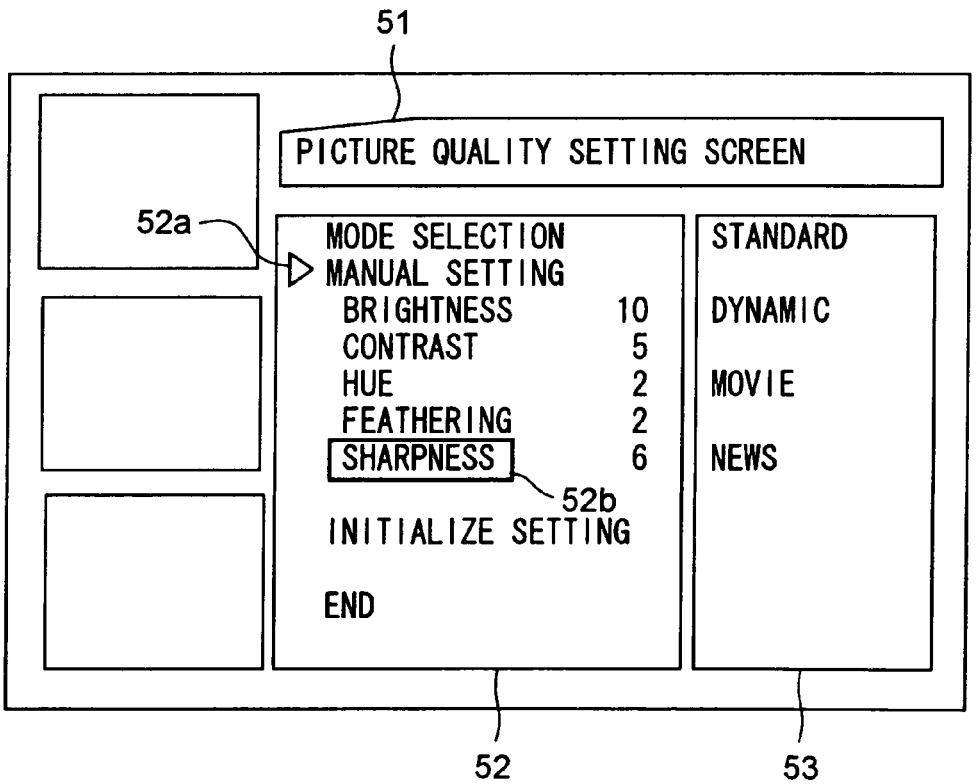
FIG. 7 is a screen diagram to show one example of a setting screen of picture quality in accordance with the present invention.

FIG. 7 is one example of the picture quality setting screen which is provided with the television device 1 according to one embodiment of the present invention as FIG. 6. The difference from FIG. 6 is that the manual selection is designated by the cursor 52*a*. A plurality of picture quality setting values for performing the manual setting are displayed as a result in the main operating area 52. It should be noted that because the cursor 53*a* is not displayed in the sub operating area 53 in this state, the picture quality setting can not be consequently performed by the mode selection.

If the manual setting is designated by the cursor 52*a*, the cursor 52*b* is displayed in the main operating area 52 and it becomes possible to perform the manual setting of setting values for the respective picture qualities. In the embodiment shown in FIG. 7, because the cursor 52*b* is placed on the sharpness, a user can increase or decrease value of the sharpness by operating the operating portion 13.

Figure 8:
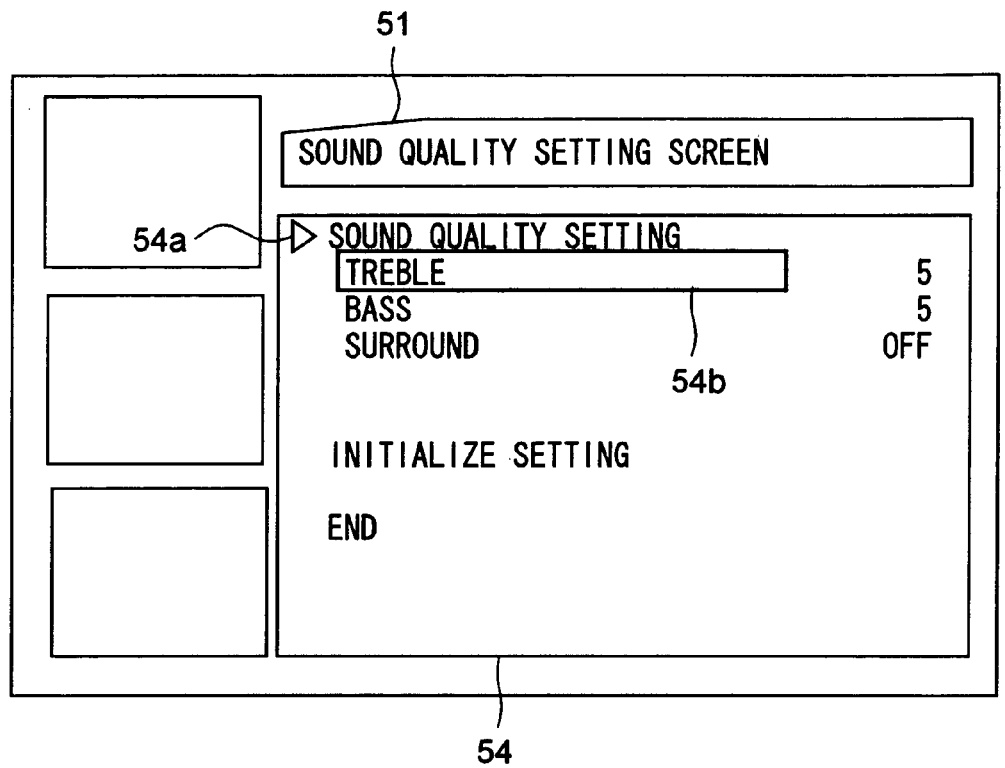
FIG. 8 is a screen diagram to show one example of a setting screen of sound quality in accordance with the present invention.
Figure 9:
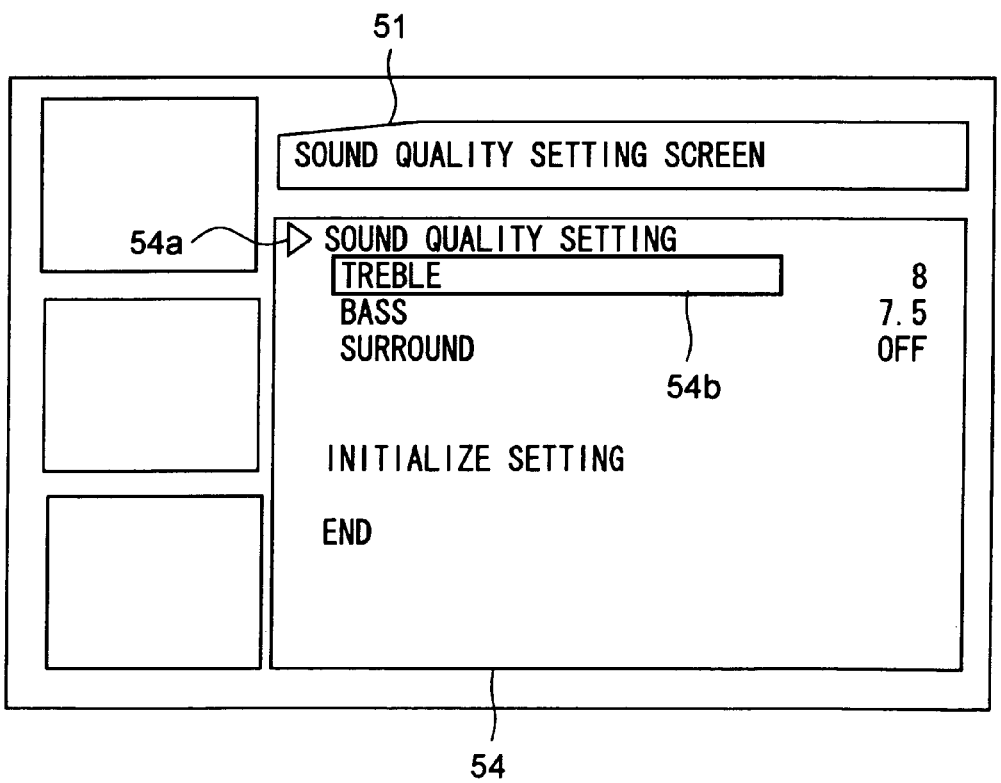
FIG. 9 is a screen diagram to show one example of a setting screen of sound quality in accordance with the present invention.

FIG. 8 and FIG. 9 are examples of the sound quality setting screens which are provided with the television device 1 according to one embodiment of the present invention. It should be noted that this screen can be displayed in arbitrary timing such as in case where the sound quality setting button which is provided with the operating portion 13 is pushed down, in case where the sound quality setting is selected by a user operation on a menu screen or the like which is displayed by OSD, or the like. As shown in FIG. 8 and FIG. 9, the sound quality setting screen is structured such that it includes at least a title display area 51, and an operating area 54.

The operating area 54 is an area in which a user performs the selecting operation when a user performs the sound quality setting. In this embodiment, if the sound quality setting is designated by the cursor 54*a*, a cursor 54*b* is displayed in the operating area 54, and it becomes possible to direct alteration of the respective sound quality setting values. In the embodiment shown in FIG. 8, a user can increase and decrease value of the treble by operating the operating portion 13 because the cursor 54*b* is placed on the treble. It should be noted that explanation about FIG. 9 is omitted here, because FIG. 9 has quite the same structure as FIG. 8 other than picture quality setting values.

<5. About Operations of Picture Quality Setting and Sound Quality Setting>

Hereinafter, picture quality setting operation and sound quality setting operation in the television device 1 according to one embodiment of the present invention will be explained with reference to the block diagrams of FIG. 1 and FIG. 2, the flow diagram of FIG. 3, the table diagrams of FIG. 4 and FIG. 5, and the screen diagrams of FIG. 6 to FIG. 9.

Figure 3:
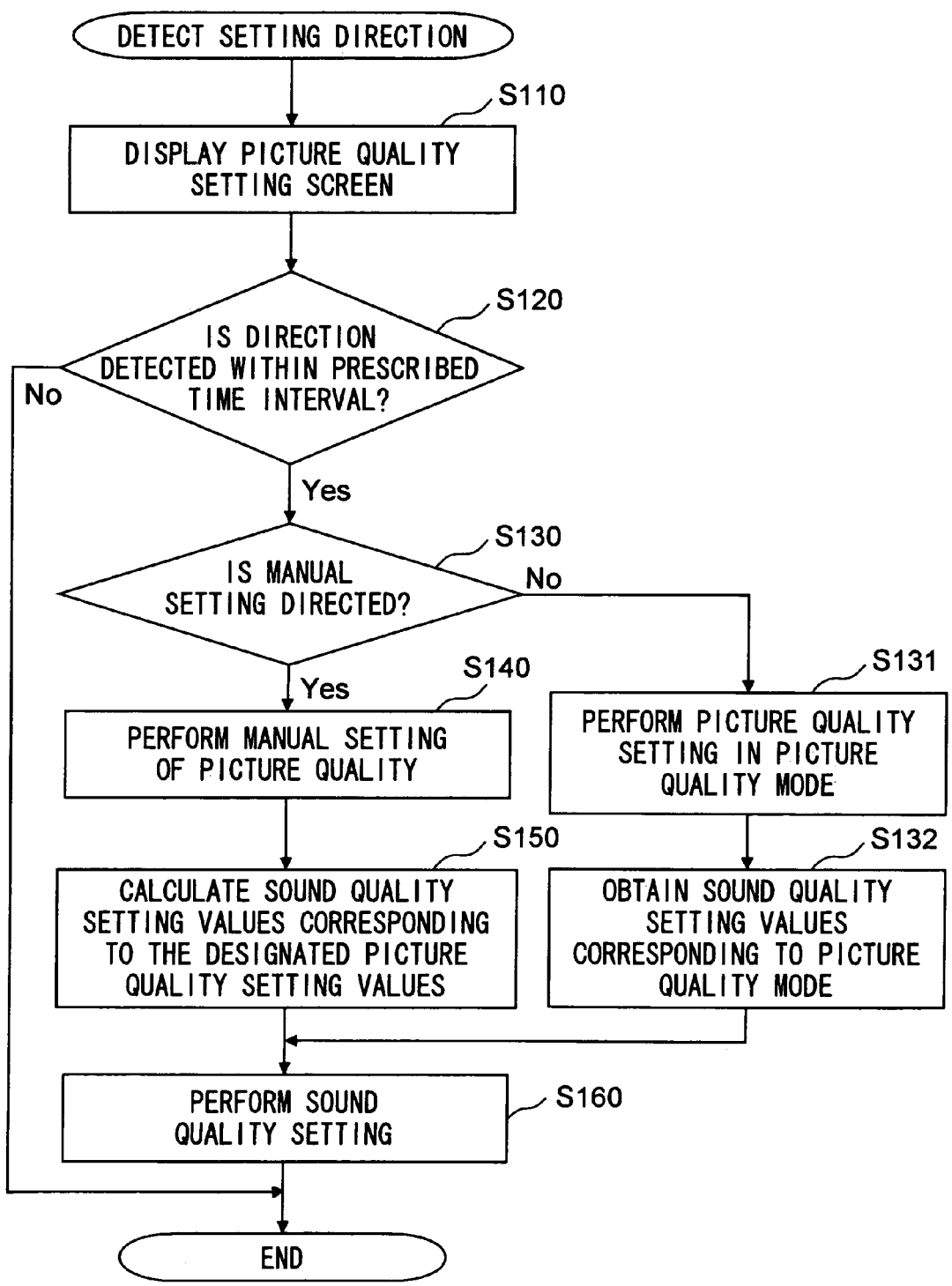
FIG. 3 is a flow diagram to show a process flow of a picture quality and sound quality setting process in accordance with the present invention.

FIG. 3 is a flowchart to show a process flow of operations of the picture quality setting and the sound quality setting according to one embodiment of the present invention. This process shown in FIG. 3 is started when a picture quality setting command from the television device 1 is detected by the control portion 11. It should be noted that the picture quality setting command is output, for example, in case where the picture quality setting button which is included in the operating portion 13 is pushed down or the like.

After this process is started, the control portion 11 displays the picture quality setting screen on the display 24 in step S110. By this step, the picture quality setting screen shown in FIG. 6 or FIG. 7 is displayed. Then, the command receiving portion 11*c* performs judgment whether the picture quality setting command which is output by an operation utilizing the operating portion 13, is received within a prescribed time interval in step S120.

In case where the picture quality setting command is not received in the prescribed time interval, the control portion 11 stops displaying the picture quality setting screen, moves to a usual screen and terminates the process. To the contrary, in case where the picture quality setting command is detected, the control portion 11 performs judgment if the selected picture quality setting method is a mode selecting method shown in FIG. 6, or a manual setting method shown in FIG. 7.

In case where the manual setting method is selected, the command receiving portion 11*c* gives the received setting command to the setting direction portion 11*e*. Then, the setting direction portion 11*e* gives the received picture quality setting values to the picture quality setting portion 11*a* to perform the picture quality setting for the video signal output portion 23 in step S140. Next, the setting direction portion 11*e* reads out the association table which is shown in FIG. 5 from the EEPROM 14 and performs calculation of the sound quality setting values that correspond to the designated picture quality setting values in step S150.

To be more concrete, for example, if the picture quality setting values which are designated by the manual setting are that the brightness is ten (10), the contrast is five (5), the hue is two (2), the feathering is two (2), and the sharpness is six (6) as shown in FIG. 7, from the association table shown in FIG. 5,
value of the treble becomes:

$$10 \text{ (value of brightness)} \times 0.5 + 6 \text{ (value of sharpness)} \times 0.5 = 8$$

and value of the bass becomes:

$$10 \text{ (value of brightness)} \times 0.5 + 5 \text{ (value of contrast)} \times 0.5 = 7.5$$

Next, the setting direction portion 11*e* performs the sound quality setting for the audio signal output portion 20 by outputting the calculated sound quality setting values to the sound quality setting portion 11*b* in step S160, then terminates this process. By this arrangement, for example, the sound quality setting values which are displayed when the sound quality setting screen is displayed, become a state as shown in FIG. 9, that is, the treble is eight (8), the bass is seven point five (7.5), and the surround is OFF.

Explanation is given for step S130 again, in case where the mode selecting method is selected in step S130, the command receiving portion 11*c* outputs the received picture quality mode to the setting direction portion 11*e*. Then, the setting direction portion 11*e* performs the picture quality setting for the video signal output portion 23 by outputting the picture quality setting values based on the received picture quality mode to the picture quality setting portion 11*a* in step S131.

Next, the setting direction portion 11*e* reads out the association table shown in FIG. 4 from the EEPROM 14 and obtains the sound quality setting values which correspond to the designated picture quality mode in step S132. For example, in case where the dynamic mode is selected as the picture quality mode as shown in FIG. 6, values of the treble five (5), the bass five (5), and the surround OFF are obtained from the association table.

Next, the setting direction portion 11*e* performs sound quality setting for the audio signal output portion 20 by output the calculated sound quality setting values to the sound quality setting portion 11*b* in step S160, then terminates the process. By this arrangement, for example, the sound quality setting values which are displayed when the sound quality setting screen is displayed, become a state as shown in FIG. 8, that is, the treble is five (5), the bass is five (5), and the surround is OFF.

It should be noted that it is preferable that the sound quality setting values which are set in step S160, can be altered by a user at any time on the sound quality setting screen after they are set. Further, even if the sound quality setting values are altered after the setting process of the picture quality and the sound quality setting processes according to the present invention are completed, it does not affect the picture quality setting. However, if the picture quality setting is performed again, the sound quality setting values that are set by the user are erased and the sound quality values which correspond to the set picture quality setting are set again.

Other Embodiments

As above described the present invention has been explained by way of preferable embodiment and the examples, however, the present invention is not limited to the above described embodiment and the present invention can be applied with various modifications without departing scope and spirit of the present invention.

Therefore, the present invention can be applied to the below described embodiments.

(A) Though in the above described embodiment generation and alteration of the association table can be performed by the user utilizing the association table editing portion, the present invention may be applied to an embodiment in which by dispensing alteration inhibiting process utilizing password or the like when the device is shipped from factory, an ordinary user who does not know the password cannot perform the alteration. By this arrangement, it is possible to prevent from setting of the association table being altered to an undesirable state.

(B) Though in the above described embodiment, automatic setting of the sound quality which corresponds to the picture quality setting is performed, the present invention may be applied to an embodiment in which automatic setting of the picture quality which corresponds to the sound quality setting is performed. In such case the sound quality modes such as "standard sound quality", "dynamic sound quality", and the like are prepared in the device in advance. Then, an association table is made and stored in which the picture quality setting values such as the brightness, the contrast, and the like that correspond to the respective sound quality modes are decided. By this arrangement, convenience of the device is improved because the user can set the picture quality at the same time by designating the sound quality setting mode.

(C) Though in the above described embodiment, the television device 1 is explained as one example of the image processing device, the present invention may be applied in any embodiment in which image processing device other than the television device is utilized. For example, the present invention may be applied in the embodiments where a BD player, a Video Cassette Recorder, a DVD/HDD composite device, a digital tuner, and the like are utilized.

(D) Though in the above described embodiment, the respective function portions which relate to the picture quality and the sound quality setting operation are realized by executing program on a calculation processing unit such as microprocessor and the like, the present invention may be applied in an embodiment in which the respective function portions are realized by a plurality of circuits.

(E) Though in the above described embodiment, explanation has been given by way of a structure, as an example, in which the respective function portions for the picture quality and the sound quality setting process are provided inside of the television device 1, the present invention may be applied to an embodiment in which a part or all of them are realized by external devices which are connected through network. For example, the present invention may be applied to an embodiment in which the association table exists in a server or the like on the network not on the EEPROM 14 and a plurality of television devices 1 may refer to it. By this arrangement, alteration of content of the association table can be collectively performed at a time.

(F) Though in the above described embodiment, after the sound quality setting values are automatically set corresponding to the picture quality mode, a user can alter the sound quality setting, the present invention may be applied to an embodiment in which a user can arbitrarily set if the manual alteration for the sound quality setting values which are automatically set, is permitted or not by the user.

(G) Though in the above described embodiment, explanation has been given about four kinds of the picture quality modes such as standard, dynamic, and the like as the example, the present invention may be applied to an embodiment in which the picture quality mode other than those are provided with the device and the sound quality setting values are correlated with them. Or, the present invention may be applied to an embodiment in which a user can arbitrarily generate the picture quality modes and can correlate the sound quality setting values with them.

What is claimed is:

1. An image processing device comprising:
   a picture quality setting portion which sets picture quality of a video signal;
   a sound quality setting portion which sets sound quality of an audio signal;
   a command receiving portion which receives designation of a setting value group to collectively set picture quality setting values of a plurality of picture quality setting items,
   a recording portion which stores an association table in which the setting value group and a sound quality setting values to direct sound quality setting for the sound quality setting portion, are correlated with each other; and
   a setting direction portion which reads out from the association table the sound quality setting values that are correlated with the setting value group when the command receiving portion receives a picture quality setting command by designation of the setting value group to direct the sound quality setting portion to set the sound quality based on the sound quality setting values which are read out, wherein
   the association table stores amount of alteration of the sound quality setting values to be altered depending on increase or decrease of the respective picture quality setting values,
   when the setting direction portion receives direction to execute an individual setting mode in which a plurality of picture quality setting items are individually set and alteration of the picture quality setting values are performed, the setting portion calculates the sound quality setting values depending on increase or decrease of the picture quality setting values utilizing the association table to direct the sound quality setting portion to set the sound quality based on the calculated values.

2. The image processing device according to claim 1, wherein when the setting direction portion receives direction to execute the individual setting mode in which a plurality of picture quality setting items are individually set, the setting direction portion reads out from the recording portion the sound quality setting values that are correlated in advance with an individual setting mode to direct the sound quality setting portion to set the sound quality based on the sound quality setting values which are read out.

3. The image processing device according to claim 1, further comprising an association table editing portion which receives content alteration command for the association table, and performs value alteration of the sound quality setting values that are contained in the association table based on the content alteration command.

4. The image processing device according to claim 1, wherein the setting value group includes at least contrast, brightness, and sharpness as the picture quality setting items.

5. The image processing device according to claim 1, wherein the sound quality setting items includes at least bass component setting, treble component setting, and effective/ineffective setting of pseudo surround effect.

* * * * *